July 24, 1928.

L. W. SKALA 1,678,132

ART OF TELEVISION

Filed Oct. 1, 1924

INVENTOR.
Ljubomir W. Skala
BY Frank Schraeder
ATTORNEYS.

July 24, 1928.

L. W. SKALA 1,678,132

ART OF TELEVISION

Filed Oct. 1, 1924

INVENTOR.
Ljubomir W. Skala
BY Frank Schraeder Jr
ATTORNEYS.

Patented July 24, 1928.

1,678,132

UNITED STATES PATENT OFFICE.

LJUBOMIR WILLIAM SKALA, OF RIVERSIDE, ILLINOIS, ASSIGNOR OF FORTY-FIVE ONE-HUNDREDTHS TO FRANK J. SCHRAEDER, JR., OF GLEN ELLYN, ILLINOIS.

ART OF TELEVISION.

Application filed October 1, 1924. Serial No. 741,025.

This invention relates to the art of instantaneously transmitting to a distance by means of certain electro-optical improvements, pictures, or an image of natural objects with their colors and movements.

My improved apparatus employs a new system for recording, transmitting and reproducing light waves forming an optical phenomenon, which caught by the retina of our eye, creates a psychological phenomenon that we call "the image."

I have applied the term "telectroscope" to this apparatus because it reproduces instantaneously the whole image of distant events or pictures subjectively like a telescope or objectively as a moving picture apparatus on the screen.

This invention does not employ any selenium or other photo-electric cells, or any mechanical improvements such as revolving mirrors or oscillographs.

The invention is based on the principle of the direct action of light-colors on an electric current and affords the transmission of movable pictures, or better, of distant events or images in natural colors.

The basic principle of my invention is found in established electro-optical phenomenon. If a light beam which is either mono- or panchromatic, but plane polarized, is passed through a certain optically-inactive substance, such as carbonic disulfite, iron or nickel carbonyl or similarly acting liquid, which is placed in an electro-magnetic field of a solenoid (coil), so that the light rays pass the field in the direction of the electro-magnetic power-lines, there will will arise a rotation of the plane of polarization which rotation will be influenced by the color of the light, the intensity of the current, the length of the coil, the temperature of the substance and the character of the substance utilized.

Heretofore, the above mentioned phenomenon has been utilized in telegraphic photography and for the receiving station only as an image transformer for varying the intensity of plane polarized white or monochromatic light rays such as found in the properties of a light valve. I employ the above mentioned principle for both stations, (sending and receiving), which makes possible a simultaneous recording, transmitting and reproducing of the whole image of a distant event or picture in motion and in natural colors. Briefly and relatively stated, the difference between the use of the above mentioned electro-optical principle by prior inventors and my invention is the same as the difference between the electromagnetic principle in telegraphy (Morse) and that in telephony (Bell). The electromagnet in telegraphy reproduces only the periodic interruptions of the electric current resulting in graphical signs or simple tones. The electromagnet in telephony records, transmits and reproduces simultaneously different sound waves, and the result is the instantaneous reproduction of the speech, music, etc., in other words, "the sound image."

The principle of my invention is based on the following scientific facts:

According to the Maxwell-Lorentz theory, light is a periodical change of electric and magnetic forces in space, at which action all disturbations in the electric and magnetic field are propagated by ether in form of waves and with the known velocity of light.

The cause of these changes are electrons which are the base of matter, light and electricity.

Every electron in motion represents an electric current with a magnetic field. At a certain temperature the motion of electrons becomes of such a character that the electric and magnetic fields start to change and the substance begins to radiate.

If light is created by the motion of electrons, then these moving electrons must awake a magnetic field around the light rays and according to well known magnetic laws this magnetic field must be influenced by another foreign magnetic field; hence the whole light phenomenon must be influenced by a magnetic field. This influence was foretold and theoretically calculated by Lorentz and a direct demonstration accomplished by Zeeman (1895), (Zeeman's triplex.)

The second proof of this theory is the well known electro-optical phenomenon, that the polarization plane of a plane polarized light ray rotatable when such light ray is passed through an optically-inactive substance which is placed in an electro-magnetic field.

Based on the above facts, the theoretical explanation of my invention is as follows:

The phenomenon of the rotation of the plane of polarization of a plane-polarized light ray passing through an optically-inactive substance, placed in an electromagnetic field in the direction of electromagnetic power-lines, is due to the influence of the magnetic forces of the electric current upon the magnetic forces of the plane-polarized light ray, which is represented by the motion of electrons in a single plane. Both of the above magnetic forces tend to take a mutually parallel position, just as two magnetic needles or two electric currents, and the result is the rotation of the oscillation plane of the light.

Or in opposite sense: If a magnetic force of an electric current can influence the magnetic force of a moving electron, or in other words, if an electro-magnetic field can influence a light ray, then in opposite sense a magnetic field of a moving electron or briefly a light ray, must influence under certain circumstances and conditions a magnetic field of an electric current and hence the electric current itself.

The influence of a plane polarized light ray which passes through a certain optical as well as electrical and chemical system or device, results in a certain work done by the electric current. Technically speaking, if the magnetic field of an electric current is periodically changed, the intensity of the electric current producing this magnetic field will vary in a correspondent manner. The disturbations of the magnetic field or respectively the variations of intensity of the electric current will according to well known electrical laws produce in another near conductor the so-called "inductive currents". The intensity of those inductive currents which is of theoretical and practical significance will be correspondent with the intensity of the primary electric current, that is, with the disturbations of the electro-magnetic field produced by this current and influenced by the passing of a plane polarized ray of light; hence, the intensity of the inductive currents will depend on: the color of the light, intensity of the primary current, length of the coil, temperature of the substance, and nature of the substance.

If these inductive currents are transmitted to another distant and independently produced electro-magnetic field, through which passes a beam of parallel plane polarized rays of white light, the inductive currents will influence this electro-magnetic field and hence the light rays passing through this field, or technically speaking, the magnetic forces of the light rays will tend to take a mutually parallel position with the magnetic forces of the electric current in the primary coil, which is now influenced by the inductive currents coming from the sending station, which will result in various degrees of rotation of the polarization plane on various points in the cross section of the white light beam. Every color and every point in the beam of white light will react only on such an inductive current which was produced by an equal color and point in the electro-magnetic field of the sending station, and in the sight field of the crossed analyzer will appear the event formed in the cross section of the white light beam, in other words, the same color in the same point as sent through the electromagnetic field of the sending station. These various colors appearing in the sight field of the analyzer points form the image of the events within the focus of the sending station.

The installation comprises two systems of apparatus functioning simultaneously, one operating as a transmitter (recorder) and the other as a receiver (reproducer). The transmission may be accomplished by wire or wireless.

One system of apparatus embodying my invention is shown in the accompanying diagrammatic drawings, in which.

Figure 5 shows diagrammatically the application of the invention to a motion picture camera.

Figure 1:
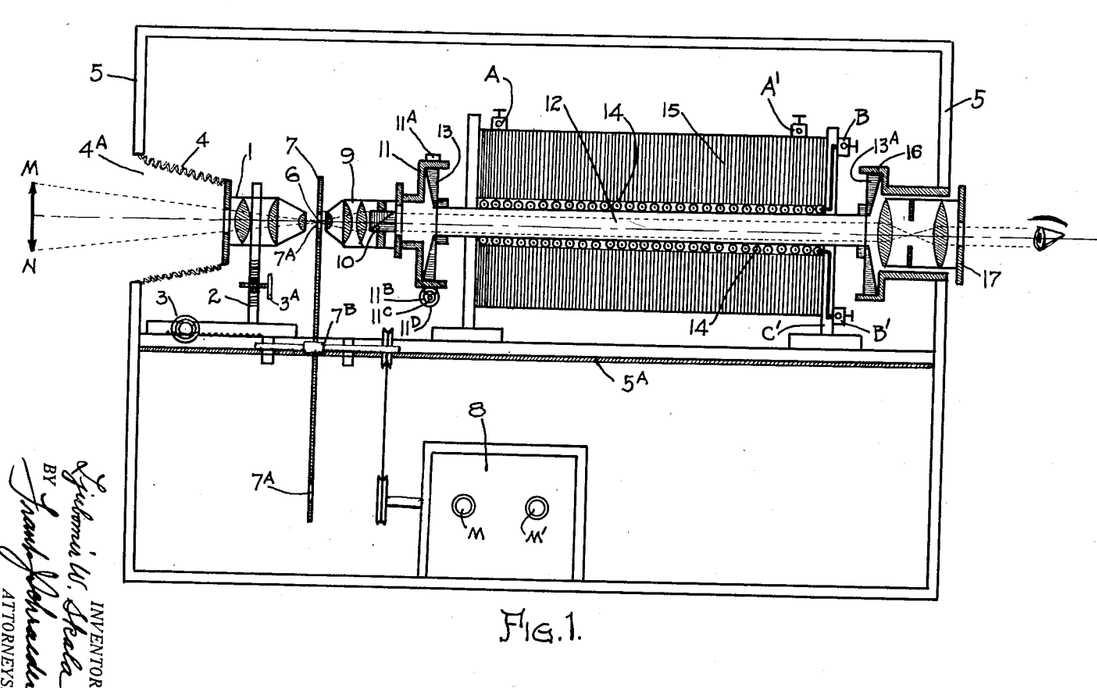
Figure 1, is a longitudinal section of an apparatus of a transmitting or sending station, and Fig. 2 a longitudinal section of a receiving station.

Referring now to the sending or transmitting station shown in Figure 1.

The light rays reflected from an object MN are caught by and passed through the objective 1, which is an optical system similar to that of a microscope objective or Abbe condenser. This objective 1, is mounted on a vertically and laterally adjustable stage 2, which is movable in both directions of the optical axis by aid of the adjustment screws 3 and 3$^A$. The objective 1 is connected by bellows 4 with the opening 4$^A$ in the front of the lightproof case 5. A microscopically reduced picture of the object MN will arise in the point 6, which lies on the optical axis of the whole system. In the place of this point 6 is placed a circular revolving opaque shade 7 having a circle of a plurality of small circular apertures 7$^A$. The centers of these small apertures lie on the optical axis in the point 6. The opaque shade 7 revolves at right angle to the optical axis about the horizontal supporting axle 7$^B$ which is driven directly or indirectly by a small electric motor 8. Opposite the object 1 and in alignment therewith, I mount the polarizing objective 9, which is similar to the objective 1, but in which is placed a Nicol prism 10. This polarizing objective 9, is rotatably connected by an improvement 11, with the end 13 of a glass polarizing tube 12 such as used in polariscopes. The connection 11 is provided with an external integral gear $11^A$ which is in mesh with the worm $11^B$ on the spindle $11^C$ operated by the adjustment $11^D$ for the purpose of manually rotating the polarizing objective 9 in both directions about the optical axis. The polarizing tube 12 is placed in a coil of insulated heavy copper wire 14, which forms the primary winding and is connected with the poles B and B' in the end C'. The secondary winding 15 forms a coil of thin insulated copper wire in insulated layers, the ends of which are connected with the poles A and A'. The polarizing tube 12 contains an optically inactive substance, such as nickel tetracarbonyl Ni(CO) or iron pentacarbonyl Fe(CO), or any other optically inactive substance such as carbon disulfide. The end $13^A$ of the polarizing tubing 12, is connected by a tubular improvement 16 with the rear opening of the case 5. In the improvement 16 is placed a suitable ocular 17. It is now apparent that the optical system of the sending or transmitting station is similar to the optical system of a microscope, but with a real microscopically small picture or image in the point 6 instead of a preparate. The optical function in the transmitting station may be explained as follows: The light rays reflected from the object MN, are converged or reduced by the objective 1 into the point 6 as a real but microscopically small picture of the object MN. The point 6, namely, the very small picture of the object MN lies in the focus of the polarizing objective 9 and hence the divergent light rays from this point 6 will be passed through the objective 9 and made parallel. By passing through the Nicol prisms 10 the parallel light rays will be plane-polarized and will travel through the optically inactive substance in the tubing 12 and through the ocular 17 which affords the possibility of seeing the enlarged picture of the object MN in point 6. The light rays passing through the tube 12 must be perfectly parallel and this may be obtained by precisely locating the real picture of the object MN in the point 6 in the focus of the polarizing objective 9 by the aid of the screw 3 of the stage 2 of the objective 1.

Figures 2, 5:
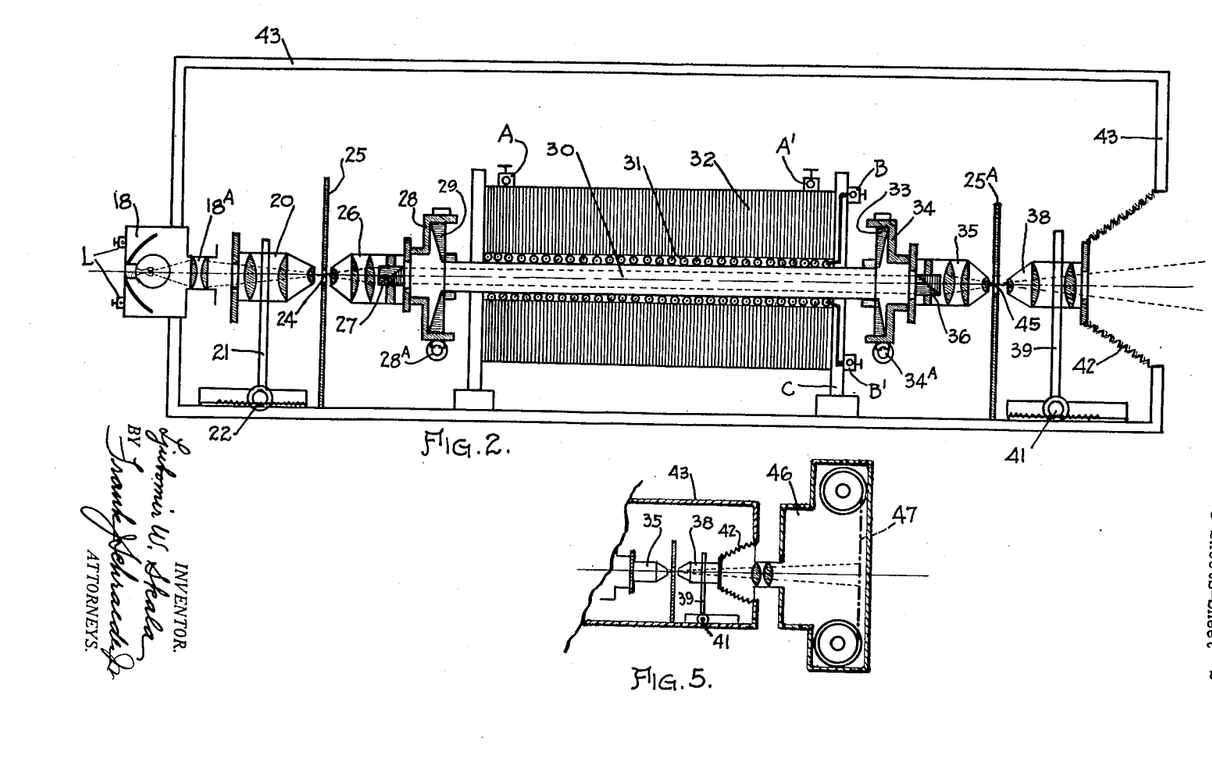

Referring now to the receiving station diagrammatically shown in Fig. 2:

18 represents a light source such as a projecting electric lamp with a condenser $18^A$ which is placed opposite the condenser 20 for emitting a beam of parallel white light rays. The condenser 20 (Abbe microscopical condenser) is placed on an adjustable stage 21, which affords movement in both directions of the optical axis by aid of the screw 22. The condenser 20, together with the following described apparatus is mounted within the lightproof case 43. Vertically to the optical axis I mount a fixed opaque shade 25 having a small aperture, the center of which lies in a point 24 on the optical axis. In alignment with the condenser 20 and on the opposite side of the shade 25, is placed a polarizing objective 26 having a Nicol prism 27 and rotatably connected in the same manner as the objective in the sending station by an improvement 28 with the end 29 of the polarizing tube 30, similar to that in the sending station. The improvement 28 affords the rotation of the polarizing objective 26 in both directions about the optical axis by the aid of the worm drive $28^A$. The electro-inducting improvement is identical with that of the sending station. A coil of insulated heavy copper wire wound around the tubing 30 forms the primary winding 31, and ends at the poles B and B' in the end C. The secondary winding 32 represents a plurality of layers of comparatively thin insulated copper wire which ends at the poles A and A'. The polarizing tubing 30 may contain an optically inactive substance, such as, nickel tetracarbonyl Ni(CO) or iron pentacarbonyl Fe(CO) or any other optically inactive substance. The optical system on the other end of the tube 30 is identical to that for the above opposite end but in reverse arrangement. The end 33 of the polarizing tubing 30 is enclosed in a rotatable improvement 34 of the objective 35, having a Nicol prism 36. The objective 35 is rotatable, through the improvement 34 by the worm drive $34^A$ in both directions about the optical axis. Opposite to the objective 35 I place the projection objective 38 which is preferably a microscopical objective or Abbe condenser. The projection objective 38 is placed on an adjustable stage 39 which is movable in both directions of the optical axis by the aid of the rack and pinion 41, and is connected by lightproof bellows 42 with the opening in the front of the lightproof case 43. Between the objective 35 and 38 is placed a stationary opaque shade or diaphragm $25^A$ having a small aperture, the center of which lies in the point 45 on the optical axis. The function of the receiving station may be explained as follows: The beam of parallel white light rays emitted by the light source 18 passing through the condenser 20 is converged into the point 24 on the optical axis in the center of the small aperture of the stationary diaphragm 25. The point 24 also lies precisely in the focus of the polarizing objective 26 and hence the divergent light rays from this point 24 are made by the polarizing objective 26 perfectly parallel and after passing the Nicol prism 27 are plane-polarized. These plane-polarized and parallel light rays pass through the optically inactive substance in the tubing 30 and then through the Nicol's prism 36 in the analyzing objective 35, from which they are projected convergently into the point 45 which lies on the optical axis and in center of the small aperture of the stationary diaphragm 37. The divergent rays from the point 45 will be made still more divergent by the projection objective 38 or in other words, the point 45 may be projected by the objective 40 to a screen as an enlarged image.

Figure 3:
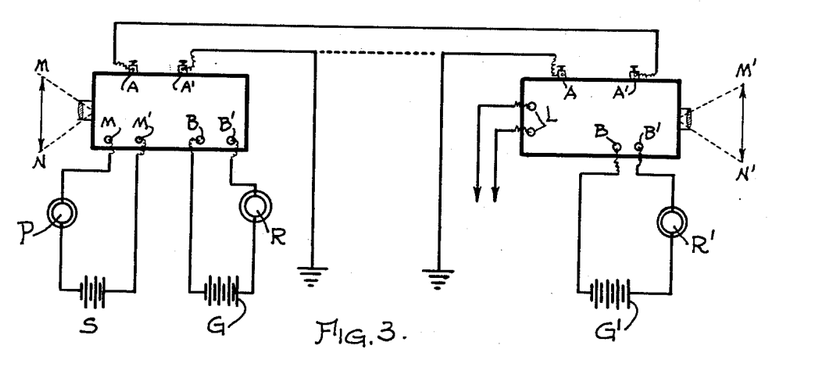
Figures 3 and 4 are respectively, diagrammatic illustrations of the transmitting and receiving stations connected by wire and by radio.

Referring to Fig. 3:

The generators for a direct current G and G' for the primary coils at the sending and receiving station are represented by a storage battery or electric generator and the current is regulated at both stations by the rheostats R and R', connected to the primary poles B and B' of both stations.

The source of electric current for the motor 8 operating the revolving shade 7 at the sending station is represented by an independent battery or power line. The regulation of the speed of the motor is controlled by a speed regulator or rheostat P.

The source of electric current for the projection lantern 18 at the receiving station represents either an independent generator or any suitable power line.

Fig. 5 also illustrates the adaptability of my invention to the permanent recording by a motion picture camera of distant events, pictures and the like by wire or radio. In recording to distant event, picture or image, the light rays from the receiving station are focused and directed into the motion picture or other camera 46 and permanently recorded on the film 47.

To prevent any magnetic disturbance from the motor 8 in the transmitting apparatus, I provide at 5^A a partition of iron or of any other suitable material.

The connection by wire, referring to Fig. 3,

The poles A and A' of the secondary winding of the sending station are connected by two wires with the poles A and A' of the secondary winding of the receiving station, or one wire may be omitted and the connection made by grounding one pole at both stations.

Figure 4:
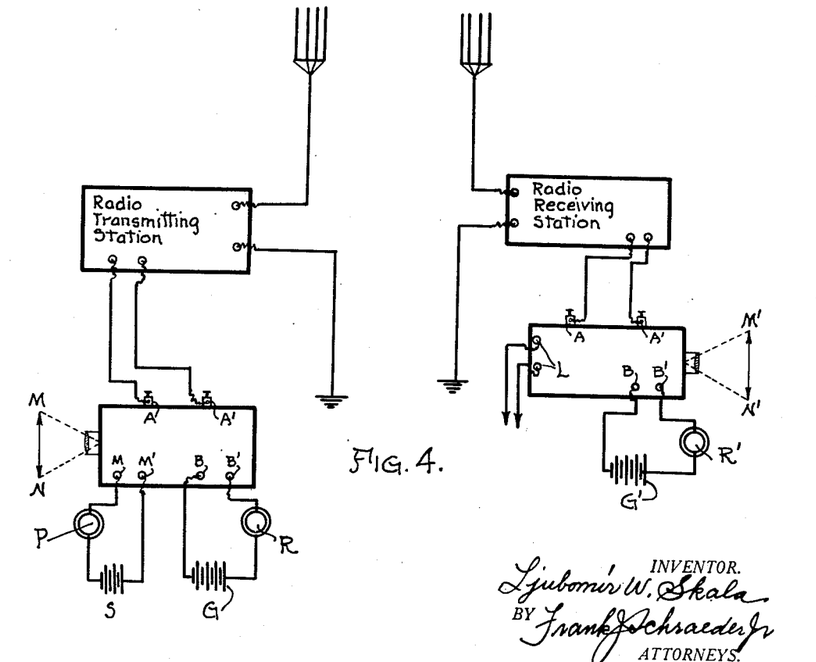

Referring to Fig. 4, the connection by wireless,

For broadcasting by radio the poles A and A' of the transmitting station are connected with a wireless transmitting station in place of the microphone since the function of the "telectroscope" sending station is analogous to the function of the microphone. The receiving station of the "telectroscope" acts as a telephone receiver, and hence the poles A and A' of my receiving station are connected with a radio receiving set in place of the telephone receiver or loud speaker.

The operation and function of my sending or transmitting station may be described as follows:—

The objective 1, of the sending station is directed on the object to be transmitted. The picture of this object may be subjectively observed through the ocular 17 and the clearness thereof obtained by the adjustment of screw 3 which moves the objective 1 laterally. The ocular 17 is then closed and the motor 8 with the revolving shade 7 set in motion and with the primary winding 14 electrically charged the transmitting station is set into operation. The electro-optical function may be explained as follows: The convergent light rays forming the image of the picture or object are converted by the above described optical system of the apparatus into a cylinder of a perfectly parallel and plane-polarized beam of light rays of different colors. This beam passes through the optically inactive substance in the glass tubing 12 which is placed in the electromagnetic field of the coil 14. In consequence of the well known rotation of polarizing planes in certain degrees which arise in an electro-magnetic field of a coil it is to be concluded that the electric current must perform a certain labor. This labor is proportional to the degree of the rotation of the polarizing plane, and the degree of this rotation is effected by the color of the light passing through the electro-magnetic field, hence the labor performed by the electric current will be proportional to the different colors of light rays passing the field and forming in all points of the vertical sections of the ray beam the image of the object MN. The revolving shade 5 causes an interruption of the beam of parallel light rays, and in consequence the variation of the intensity of the electro-magnetic field, that is, the intensity of the electric current which passes through the primary winding 14. This variation of intensity of the electric current in the primary winding 14 responds to the various light colors in the light beam passing through the coil and acts inductively on the secondary winding 15 of the coil to produce the correspondent inductive currents which are transmitted to a receiving station.

*The receiving station.*

The rays of white light emitted by the light source 18 are made convergent by the condenser 18^A and will further be converged by the movable condenser 20 which is mounted on a stage 21 and movable in both directions of the optical axis by means of the adjustment 22. The light rays converge into the point 24 which lies on the optical axis and also in the focus of the polarizing objective 26. In the vertical plane of this point 24 is placed an opaque shade or diaphragm 25 with a small aperture, the center of which lies on the optical axis. The divergent light rays from the point 24 are passed through the polarizing objective 26 and are made plane-polarized and parallel, and as such, traverse through the electromagnetic field of the coil 31. The rays reach then the analyzing objective 35 and according to its position, either pass through or are withheld by it and hence the sight field of the analyzator 35 which is projected enlarged by the objective 38 on a screen, or observed subjectively, is either dark or light. The practical operation is as follows: The light in the projection lantern 18 will be turned on and the illuminated sight field of the analyzator 36 will be projected on the screen. The clearness of the picture will be obtained by moving the adjustment screws 22 and 41 which moves the condenser 20 and the objective 38. The primary winding 31 is at this time without any current. By turning, by the aid of the screw 34$^A$, the analyzing objective 35 about the optical axis, the sight field will become dark. After that the electric circuit will be closed to charge the primary winding 31 and to cause a projection of the picture of the sight field of the analyzator 36, in consequence of the rotation of the polarizing plane caused by the flowing current. Then the analyzing objective 35 is again adjusted by aid of the screw 34$^A$ by turning same to a certain degree to again darken the sight field of the analyzator and its projection. If we now connect the poles A and A' of the secondary winding by wire or wireless with the secondary poles A and A' of the sending station, then in the sight field of the analyzator 35, that is, in its projection on the screen, there will appear the image of the object MN transmitted by the distant sending station. The picture will appear in all the colors and motion of the transmitted object MN.

The function of the receiving station may be explained as follows: The inductive electric currents from the sending station respond to the various colors on various points of the cross sections of the beam of parallel light rays passing through the electro-magnetic field of the sending station which light rays form the image of the object MN. The induction currents coming from the sending station by wire or wireless will act on the receiving station in opposite sense, namely, the action on the primary electric current, and hence the electro-magnetic field of the coil through which the cylindrical beam of plane-polarized parallel white light rays passes will be stronger or weaker but perfectly correspondent with the variations of intensity of the electro-magnetic field in the sending station, and the polarizing planes of the white light rays will be turned for the same degree and in the same points of the cross section as the polarizing planes of the light rays acting upon the primary current of the sending station which forms the image of the object MN. The degree of this rotation is dependent upon the color or wave length of the light ray, hence the inductive currents coming from the sending station caused by certain light colors in certain points of the electromagnetic field will act in the receiving station on an identical colors and points cross section of the beam of parallel white light rays passing through the electromagnetic field. In consequence of this variation of the intensity of the electromagnetic field in the receiving station the rotation of the polarizing planes of certain rays in certain points of the cross section will cause certain rays to pass through the crossed analyzator and certain other rays which are not affected by this variation will be withheld by it. By this action the sight field of the analyzator will be unevenly illuminated in the various light colors which phenomenon will create the image of the object MN transmitted by the sending station.

While I have shown and described my invention as employing a polarizing tube of glass containing an optically inactive substance within the electromagnetic field of the inducting coil, I do not wish to limit myself to such preferred form as the core may be of any other suitable material and furthermore, my experiments lead me to believe that the magnetic field may be influenced without the employment of any substance whatever in the core or polarizing tube. I do, however, prefer to employ a coil with a core or tube having an optically inactive substance as the results I have obtained appear more satisfactory. Likewise, it is apparent that certain results may be obtained in the transmission of images to a receiving station such as I have described wherein the electromagnetic current in the primary winding of the coil is eliminated.

I claim:

1. The art of transmitting an image in motion and natural colors to a distance which includes the steps of detecting and transforming the light rays received from said image into corresponding waves in an electric current, transmitting said electric waves to a receiving apparatus to affect an electro-magnetic field therein, passing a beam of plane-polarized parallel rays of white light through said magnetic field to retransform said beam of light into said image.

2. The art of transmitting an image in motion and natural colors to a distance which includes the steps of detecting and transforming the light rays received from said image through an optically inactive medium into corresponding waves in an electric current, transmitting said electric waves to a receiving apparatus to affect an electromagnetic field therein, passing a beam of plane-polarized parallel rays of white light through said magnetic field to retransform said beam of light into said image.

3. The art of transmitting an image in motion to a distance which includes the steps of detecting and transforming the light rays received from said image through an optically inactive medium into corresponding waves in an electric current, transmitting said electric waves to a receiving apparatus to affect an electro-magnetic field therein, passing a beam of plane-polarized parallel rays of white light through said magnetic field to retransform said beam of light into said image.

4. The art of transmitting an image to a distance which includes the transformation of the light rays received from said image through an optically inactive medium into corresponding electric waves, transmitting said electric waves to distant receiving apparatus, and there retransforming said electric waves into said image, such retransformed image being instantaneous and in natural colors.

5. The method of transmitting to a distance images of natural objects with their colors and movement, which includes the steps of converting the light rays from the image into a beam of interrupted plane-polarized parallel rays, passing said interrupted plane-polarized parallel light rays successively through an optically inactive substance in an electromagnetic field to produce inductive currents, transmitting said inductive currents to an electro-magnetic field in a receiving station, passing a beam of plane-polarized parallel rays of white light through an optically inactive substance within the electro-magnetic field of said receiving station, whereby the polarizing planes of said rays of white light will be rotated to corresponding rotations of the polarizing planes of the light rays received from the image within the focus of the transmitting station, and then optically converting and visibly projecting said light rays into a retransformed image of the object within the focus of the transmitting station.

6. The method of transmitting to a distance images of natural objects with their colors and movement which includes the steps of reducing the light rays from the image into a microscopical image, then rapidly and successively interrupting the passage of said rays, then projecting said interrupted rays into a cylinder of plane-polarized parallel rays through an optically inactive substance in an electro-magnetic field for producing inductive currents, transmitting said inductive currents to an electromagnetic field in a receiving station, passing a beam of plane-polarized parallel rays of white light through an optically inactive substance within the electromagnetic field of said receiving station whereby the polarizing planes of said rays of white light will be rotated in correspondence to the rotations of the polarizing planes of the light rays received from the image within the focus of the transmitting station, and then optically converting and projecting said light rays into a retransformed image of the object within the focus of the transmitting station.

7. The method of transmitting to a distance images of natural objects with their colors and movement which includes the steps of projecting the light rays from the image in a beam of interrupted plane-polarized parallel rays through an optically inactive substance in an electromagnetic field of an induction coil for producing or effecting impulses of varying intensity in the inductive current passing through said coil, transmitting said inductive current to an induction coil at a receiving station, passing a beam of plane-polarized parallel rays of white light through an optically inactive substance within the electro-magnetic field of said receiving station coil, whereby the polarizing planes of said rays of white light will be rotated in correspondence to the rotations of the polarizing planes of the light rays received from the image of the transmitting station, and then optically converting and visibly projecting said light rays into a retransformed image of the objects within the focus of the transmitting station.

8. The method of transmitting to distance images of natural objects with their colors and movement, which includes the steps of converting the light rays from the image into a beam of interrupted plane-polarized parallel rays, passing said interrupted plane-polarized parallel light rays successively through an optically inactive substance in an electromagnetic field for producing inductive currents, transmitting said inductive currents to a receiving station, influencing by said inductive current from said transmitting station means in a receiving station operating reversedly to corresponding means in said transmitting station for effecting a beam of white light rays whereby the polarizing planes of said beam of white light rays will be rotated in correspondence to the rotation of the polarizing planes of the light rays received from the image within the focus of the transmitting station, and optically converting and visibly projecting said beam of effected rays as a retransformed image of the object within the focus of the trasmitting station.

9. The method of transmitting to a distance images of natural objects with their colors and movement, which includes the steps of reducing the light rays from the image into a microscopical point, then rapidly and successively interrupting the passage of said rays, then projecting said interrupted rays into a cylinder of plane-polarized parallel rays through an optically inactive substance in an electro-magnetic field for producing inductive currents, transmitting said inductive current to a receiving station, influencing by said inductive current from said transmitting station means in a receiving station operating reversedly to corresponding means in said transmitting station for affecting a beam of white light rays whereby the polarizing planes of said beam of white light rays will be rotated in correspondence to the rotation of the polarizing planes of the light rays received from the image within the focus of the transmitting station, and optically converting and projecting said beam of affected rays as a retransformed image of the object within the focus of the transmitting station.

10. The method of transmitting to a distance images of natural objects with their colors and movement which includes the steps of projecting the light rays from the image in a beam of interrupted plane-polarized parallel rays through an optically inactive substance in an electromagnetic field of an induction coil for producing or effecting impulses of varying intensity in the inductive current passing through said coil, transmitting said inductive current to a receiving station, influencing by said inductive current from said transmitting station means in a reeciving station operating reversedly to corresponding means in said transmitting station for effecting a beam of white light rays whereby the polarizing planes of said beam of white light rays will be rotated in correspondence to the rotation of the polarizing planes of the light rays received from the image within the focus of the transmitting station, and optically converting and projecting said beam of affected rays as a retransformed image of the object within the focus of the transmitting station.

11. The art of transmitting to a distance images of natural objects which consists in electro-optically transforming light rays from natural objects into corresponding waves in an electric current, and transmitting said electric waves to a receiving station and there electro-optically transforming a beam of plane-polarized parallel light waves under the influence of said electric waves into an identical image within the focus of the transmitting station.

12. The art of transmitting to a distance images of natural objects which consists in electro-optically transforming light rays of different color and wave length from natural objects into corresponding inductive electric currents through an optically inactive medium, transmitting said inductive currents to a receiving station and there electro-optically transforming said inductive currents into an identical image within the focus of the transmitting station.

13. In apparatus for transmitting to a distance images of natural objects, a transmitting station having an optional system for receiving and projecting the light rays from the image into a beam of plane-polarized parallel rays, an inductive coil having an electromagnetic field, an optically inactive substance within said electromagnetic field, and means for intermittently and successively passing said beam of plane-polarized parallel rays through said optically inactive substance for producing impulses of varying intensity in the inductive current of said coil, means for transmitting said inductive current, a receiving station having an induction coil adapted to receive said electric impulses in the secondary winding thereof, a source of white light rays, an optical system for plane-polarizing and parallelly projecting said white light rays through an optically inactive substance within the electromagnetic field of said receiving station induction coil, whereby the polarizing planes of said white light rays will be rotated in correspondence with the rotation of the polarizing planes of the light rays received from the image within the focus of the transmitting station, and optical means for visibly projecting said rays passing through the induction coil of the receiving station into a retransformed image of the objects within the focus of the transmitting station.

14. In apparatus for transmitting to a distance images of natural objects, a transmitting station having an optical system for receiving and projecting the light rays from the image into a beam of plane-polarized parallel rays, an induction coil having an electromagnetic field, and means for projecting said beam of plane-polarized parallel rays within said electromagnetic field for influencing the inductive current of said coil, means for transmitting said inductive current, a receiving station having an induction coil adapted to receive said transmitted inductive current in the secondary winding thereof, means for projecting a beam of plane-polarized parallel white light rays through the electro-magnetic field of said receiving station induction coil, whereby the polarizing planes of said white light rays will be rotated in correspondence with the rotation of the polarizing planes of the light rays received from the image within the focus of the distant transmitting station and optical means for visibly projecting said rays passing through said receiving station induction coil into a retransformed image of the object in the focus of the transmitting station.

15. The method of transmitting to a distance images of natural objects which includes the steps of converting the light rays from the image into a beam of interrupted plane-polarized parallel rays, passing said interrupted plane-polarized parallel light rays successively through an optically inactive substance in an electromagnetic field for producing inductive currents, transmitting said inductive current to an electro-magnetic field in a receiving station, passing a beam of plane-polarized parallel rays of white light through the electromagnetic field of said receiving station transformer, whereby the polarizing planes of said rays of white light will be rotated to corresponding rotations of the polarizing planes of the light rays received from the image within the focus of the transmitting station, and then optically converting and visibly projecting said light rays into a retransformed image of the object within the focus of the transmitting station.

16. The method of transmitting to a distance images of natural objects which includes the steps of reducing the light rays from the image into a microscopical image, then rapidly and successively interrupting the passage of said rays, then projecting said interrupted rays into a cylinder of plane-polarized parallel rays through an electromagnetic field for producing inductive currents, transmitting said inductive currents to an electro-magnetic field in a receiving station, passing a beam of plane-polarized parallel rays of white light through the electromagnetic field of said receiving station whereby the polarizing planes of said rays of white light will be rotated in correspondence to the rotations of the polarizing planes of the light rays received from the image within the focus of the transmitting station, and then optically converting and projecting said light rays into a retransformed image of the object within the focus of the transmitting station.

17. The method of transmitting to a distance images of natural objects which includes the steps of projecting the light rays from the image in a beam of interrupted plane-polarized parallel rays through an electromagnetic field of an induction coil for producing or effecting impulses of varying intensity in the inductive current passing through said coil, transmitting said inductive current to an induction coil at a receiving station, passing a beam of plane-polarized parallel rays of white light through the electromagnetic field of said receiving station coil, whereby the polarizing planes of said rays of white light will be rotated in correspondence to the rotations of the polarizing planes of the light rays received from the image at the transmitting station, and then optically converting and visibly projecting said light rays into a retransformed image of the objects within the focus of the transmitting station.

18. The method of transmitting to distance images of natural objects, which includes the steps of converting the light rays from the image into a beam of interrupted plane-polarized parallel rays, passing said interrupted plane-polarized parallel light rays successively through an electromagnetic field for producing inductive currents, transmitting said inductive currents to a receiving station, influencing by said inductive current from said transmitting station means in a receiving station operating reversedly to corresponding means in said transmitting station for affecting a beam of white light rays whereby the polarizing planes of said beam of white light rays will be rotated in correspondence to the rotation of the polarizing planes of the light rays received from the image within the focus of the transmitting station, and optically converting and visibly projecting said beam of affected rays as a retransformed image of the object within the focus of the transmitting station.

19. The method of transmitting to a distance images of natural objects with their colors and movement, which includes the steps of reducing the light rays from the image into a microscopical image, then rapidly and successively interrupting the passage of said rays, then projecting said interrupted rays into a cylinder of plane-polarized parallel rays through an electromagnetic field for producing inductive currents, transmitting said inductive currents to a receiving station, influencing by said inductive current from said transmitting station means in a receiving station operating reversedly to corresponding means in said transmitting station for affecting a beam of white light rays whereby the polarizing planes of said beam of white light rays will be rotated in correspondence to the rotation of the polarizing planes of the light rays received from the image within the focus of the transmitting station, and optically converting and projecting said beam of affected rays as a retransformed image of the object within the focus of the transmitting station.

20. The method of transmitting to a distance images of natural objects with their colors and movement which includes the steps of projecting the light rays from the image in a beam of interrupted plane-polarized parallel rays through an electromagnetic field of an induction coil for producing or effecting impulses of varying intensity in the inductive current passing through said coil, transmitting said inductive current to a receiving station, influencing by said inductive current from said transmitting station means in a receiving station operating reversedly to corresponding means in said transmitting station for affecting a beam of white light rays whereby the polarizing planes of said beam of white light rays will be rotated in correspondence to the rotation of the polarizing planes of the light rays received from the image within the focus of the transmitting station, and optically converting and projecting said beam of affected rays as a retransformed image of the object within the focus of the transmitting station.

21. In the art of transmitting images of natural objects in motion and natural color to a distant point, a transmitting station, a receiving station, means for generating a current and an electromagnetic field in said transmitting station and in said receiving station, means for passing the light rays from the object within the focus of said transmitting station through the electromagnetic field in said transmitting station for influencing the said current generating said electromagnetic field therein, means for transmitting such influenced current to the receiving station for affecting said electromagnetic field therein, and means for passing a beam of plane-polarized parallel rays of white light through said electromagnetic field of said receiving station whereby said beam of plane-polarized parallel rays will be divided into a composite beam of rays forming in cross section the identical image within the focus of the transmitting station.

In witness whereof I affix my signature.

LJUBOMIR WILLIAM SKALA.